United States Patent
Laberteaux et al.

(10) Patent No.: US 6,266,409 B1
(45) Date of Patent: Jul. 24, 2001

(54) ECHO CANCELLER EMPLOYING DUAL-H ARCHITECTURE HAVING IMPROVED DOUBLE-TALK DETECTION

(75) Inventors: Kenneth P. Laberteaux, South Bend; Richard C. Younce, Wakarush, both of IN (US)

(73) Assignee: Tellabs Operations, Inc., Lisle, IL (US)

( * ) Notice: Subject to any disclaimer, the term of this patent is extended or adjusted under 35 U.S.C. 154(b) by 0 days.

(21) Appl. No.: 08/971,116

(22) Filed: Nov. 14, 1997

(51) Int. Cl.$^7$ ............... H04M 1/00; H04M 9/08
(52) U.S. Cl. ............ 379/410; 379/411; 379/406
(58) Field of Search ................ 379/410, 406, 379/407, 408, 409, 411, 390, 365; 364/724.19; 370/286, 287, 291

(56) References Cited

U.S. PATENT DOCUMENTS

| | | | | |
|---|---|---|---|---|
| 3,787,645 | * | 1/1974 | Ochiai et al. | 379/406 |
| 4,757,527 | * | 7/1988 | Beniston et al. | 379/410 |
| 4,894,820 | * | 1/1990 | Miyamoto et al. | 370/289 |
| 4,918,727 | * | 4/1990 | Rohrs et al. | 379/410 |
| 5,274,705 | * | 12/1993 | Younce et al. | 379/410 |
| 5,307,405 | * | 4/1994 | Sih | 379/410 |
| 5,463,618 | * | 10/1995 | Furukawa et al. | 370/290 |
| 5,592,548 | * | 1/1997 | Sih | 379/410 |
| 5,631,900 | * | 5/1997 | McCaslin et al. | 370/287 |
| 5,644,635 | * | 7/1997 | Armbruster | 379/390 |
| 5,646,991 | * | 7/1997 | Sih | 379/410 |
| 5,664,011 | * | 9/1997 | Crochiere et al. | 379/410 |
| 5,668,794 | * | 9/1997 | McCaslin et al. | 379/410 |
| 5,745,564 | * | 4/1998 | Meek | 379/410 |

* cited by examiner

Primary Examiner—Stella Woo
(74) Attorney, Agent, or Firm—McAndrews, Held & Malloy Ltd.

(57) ABSTRACT

An echo canceller circuit for use in an echo canceller system is set forth. The echo canceller circuit comprises a first digital filter having non-adaptive tap coefficients to simulate an echo response occurring during a call. A second digital filter having adaptive tap coefficients to simulate an echo response occurring during the call is also used. The adaptive tap coefficients of the second digital filter are updated over the duration of the call. A coefficient transfer controller is disposed in the echo canceller circuit to transfer the adaptive tap coefficients of the second digital filter to replace the tap coefficients of the first digital filter when a value, $\hat{E}$, is greater than a value, $\bar{E}$, and, concurrently, when $\hat{E}$ is greater than a value, $E_{max}$. The value of $\bar{E}$ corresponds to the ratio between a signal-plus-echo signal and a first echo compensated signal using the first digital filter. The value of $\hat{E}$ corresponds to the ratio between the signal-plus-echo signal and a second echo compensated signal using the second digital filter. The value of $E_{max}$ corresponds to the largest $\hat{E}$ experienced over at least a portion of the duration of the call and at which a transfer occurred.

14 Claims, 5 Drawing Sheets

ECHO CANCELLER EMPLOYING DUAL-H ARCHITECTURE HAVING IMPROVED DOUBLE-TALK DETECTION

CROSS-REFERENCE TO RELATED APPLICATIONS

The following applications, filed on even date, herewith, are incorporated by reference: U.S. Ser No. 08/970,230, "Echo Canceller Employing Dual-H Architecture Having Improved Coefficient Transfer"; U.S. Ser No. 08/970,228, "Echo Canceller Employing Dual-H Architecture Having Improved Non-Linear Echo Path Detection"; U.S. Ser No. 08/970,874, "Echo Canceller Employing Dual-H Architecture Having Variable Adaptive Gain Settings"; U.S. Ser No. 08/970,639, "Echo Canceller Employing Dual-H Architecture Having Improved Non-Linear Processor"; U.S. Ser No. 08/970,229, "Echo Canceller Employing Dual-H Architecture Having Split Adaptive Gain Settings."

STATEMENT REGARDING FEDERALLY SPONSORED RESEARCH OR DEVELOPMENT

Not Applicable

BACKGROUND OF THE INVENTION

Long distance telephone facilities usually comprise four-wire transmission circuits between switching offices in different local exchange areas, and two-wire circuits within each area connecting individual subscribers with the switching office. A call between subscribers in different exchange areas is carried over a two-wire circuit in each of the areas and a four-wire circuit between the areas, with conversion of speech energy between the two and four-wire circuits being effected by hybrid circuits. Ideally, the hybrid circuit input ports perfectly match the impedances of the two and four-wire circuits, and its balanced network impedance perfectly matches the impedance of the two-wire circuit. In this manner, the signals transmitted from one exchange area to the other will not be reflected or returned to the one area as echo. Unfortunately, due to impedance differences which inherently exist between different two and four-wire circuits, and because impedances must be matched at each frequency in the voice band, it is virtually impossible for a given hybrid circuit to perfectly match the impedances of any particular two and four-wire transmission circuit. Echo is, therefore, characteristically part of a long distance telephone system.

Although undesirable, echo is tolerable in a telephone system so long as the time delay in the echo path is relatively short, for example, shorter than about 40 milliseconds. However, longer echo delays can be distracting or utterly confusing to a far end speaker, and to reduce the same to a tolerable level an echo canceller may be used toward each end of the path to cancel echo which otherwise would return to the far end speaker. As is known, echo cancellers monitor the signals on the receive channel of a four-wire circuit and generate estimates of the actual echoes expected to return over the transmit channel. The echo estimates are then applied to a subtractor circuit in the transmit channel to remove or at least reduce the actual echo.

In simplest form, generation of an echo estimate comprises obtaining individual samples of the signal on the receive channel, convolving the samples with the impulse response of the system and then subtracting, at the appropriate time, the resulting products or echo estimates from the actual echo on the transmit channel. In actual practice generation of an echo estimate is not nearly so straightforward.

Transmission circuits, except those which are purely resistive, exhibit an impulse response has amplitude and phase dispersive characteristics that are frequency dependent, since phase shift and amplitude attenuation vary with frequency. To this end, a suitable known technique for generating an echo estimate contemplates manipulating representations of a plurality of samples of signals which cause the echo and samples of impulse responses of the system through a convolution process to obtain an echo estimate which reasonably represents the actual echo expected on the echo path. One such system is illustrated in FIG. 1.

In the system illustrated in FIG. 1, a far end signal x from a remote telephone system is received locally at line 10. As a result of the previously noted imperfections in the local system, a portion of the signal x is echoed back to the remote site at line 15 along with the signal v from the local telephone system. The echo response is illustrated here as a signal s corresponding to the following equation:

$$s = h * x$$

where h is the impulse response of the echo characteristics. As such, the signal sent from the near end to the far end, absent echo cancellation, is the signal y, which is the sum of the telephone signal v and the echo signal s. This signal is illustrated as y at line 15 of FIG. 1.

To reduce and/or eliminate the echo signal component s from the signal y, the system of FIG. 1 uses an echo canceller having an impulse response filter $\bar{h}$ that is the estimate of the impulse echo response h. As such, a further signal $\bar{s}$ representing an estimate of echo signal s is generated by the echo canceller in accordance with the following equation:

$$\bar{s} = \bar{h} * x$$

The echo canceller subtracts the echo estimate signal $\bar{y}$ from the signal y to generate a signal e at line 20 that is returned to the far end telephone system. The signal e thus corresponds to the following equation:

$$e = s + v - \bar{s} \approx v$$

As such, the signal returned to the far end station is dominated by the signal v of the near end telephone system. As the echo impulse response $\bar{h}$ more closely correlates to the actual echo response h, then s-bar more closely approximates s and thus the magnitude of the echo signal component s on the signal e is more substantially reduced.

The echo impulse response model $\bar{h}$ may be replaced by an adaptive digital filter having an impulse response $\hat{h}$. Generally, the tap coefficients for such an adaptive response filter are found using a technique known as Normalized Least Mean Squares adaptation.

Although such an adaptive echo canceller architecture provides the echo canceller with the ability to readily adapt to changes in the echo path response h, it is highly susceptible to generating sub-optimal echo cancellation responses in the presence of "double talk" (a condition that occurs when both the speaker at the far end and the speaker at the near end are speaking con currently as determined from the viewpoint of the echo canceller).

To reduce this sensitivity to double-talk conditions, it has been suggested to use both a non-adaptive response and an adaptive response filter in a single echo canceller. One such echo canceller is described in U.S. Pat. No. 3,787,645, issued to Ochiai et al on Jan. 22, 1974. Such an echo canceller is now commonly referred to as a dual-H echo canceller.

Although the dual-H echo canceller architecture of the '645 patent provides substantial improvements over the use of a single filter response architecture, the '645 patent is deficient in many respects and lacks certain teachings for optimizing the use of such a dual-H architecture in a practical echo canceller system. For example, in a practical echo canceller system, a need exists to detect the presence of a double-talk condition. Such a condition exists when, for example, the near-end party and far-end party both talk at the same time. In such instances, the echo canceller system should recognize the condition and adapt its operation accordingly. In accordance with one such adaptation, it may be desirable to inhibit the adaptation procedure of the adaptive digital filter until such time as the double-talk condition no longer exists. In this manner, the adaptation process is not corrupted by the near-end signal. The present inventors have recognized these problems associated with the foregoing dual-H architecture and have provided a solution to the double-talk detection.

BRIEF SUMMARY OF THE INVENTION

An echo canceller circuit for use in an echo canceller system is set forth that provides sensitive double-talk detection. The echo canceller circuit comprises a first digital filter having non-adaptive tap coefficients to simulate an echo response occurring during a call. A second digital filter having adaptive tap coefficients to simulate an echo response occurring during the call is also used. The adaptive tap coefficients of the second digital filter are updated over the duration of the call. A coefficient transfer controller is disposed in the echo canceller circuit to transfer the adaptive tap coefficients of the second digital filter to replace the tap coefficients of the first digital filter when a set of one or more transfer conditions is met. A double-talk detector is provided. The double-talk detector is responsive to a value $E_{max}$ occurring after lapse of a convergence time for declaring a double-talk condition. The value $E_{max}$ corresponds to the largest $\hat{E}$ value experienced over at least a portion of the duration of the call at which a transfer occurred. The value of $\hat{E}$ corresponds to the ratio between the signal-plus-echo signal and a second echo compensated signal that is generated using the second digital filter.

The double-talk detector may use the value of $\hat{E}$ in a number of ways pursuant to the double-talk detection process. For example, the double-talk detector may use the value of $E_{max}$ to set a double-talk threshold value and use a comparison between $\hat{E}$ and the double-talk threshold value to determine whether a double-talk condition exists. The double-talk detector may likewise use a comparison between $\hat{E}$ and $E_{max}$ to determine whether a double-talk condition exists.

A method for detecting a double-talk condition in a dual-H echo canceller such as the one described immediately above is also set forth. The method involves ascertaining the value $E_{max}$ after lapse of a convergence time and using the value of $E_{max}$ to determine the existence of a double-talk condition.

DETAILED DESCRIPTION OF THE INVENTION

Figure 1:
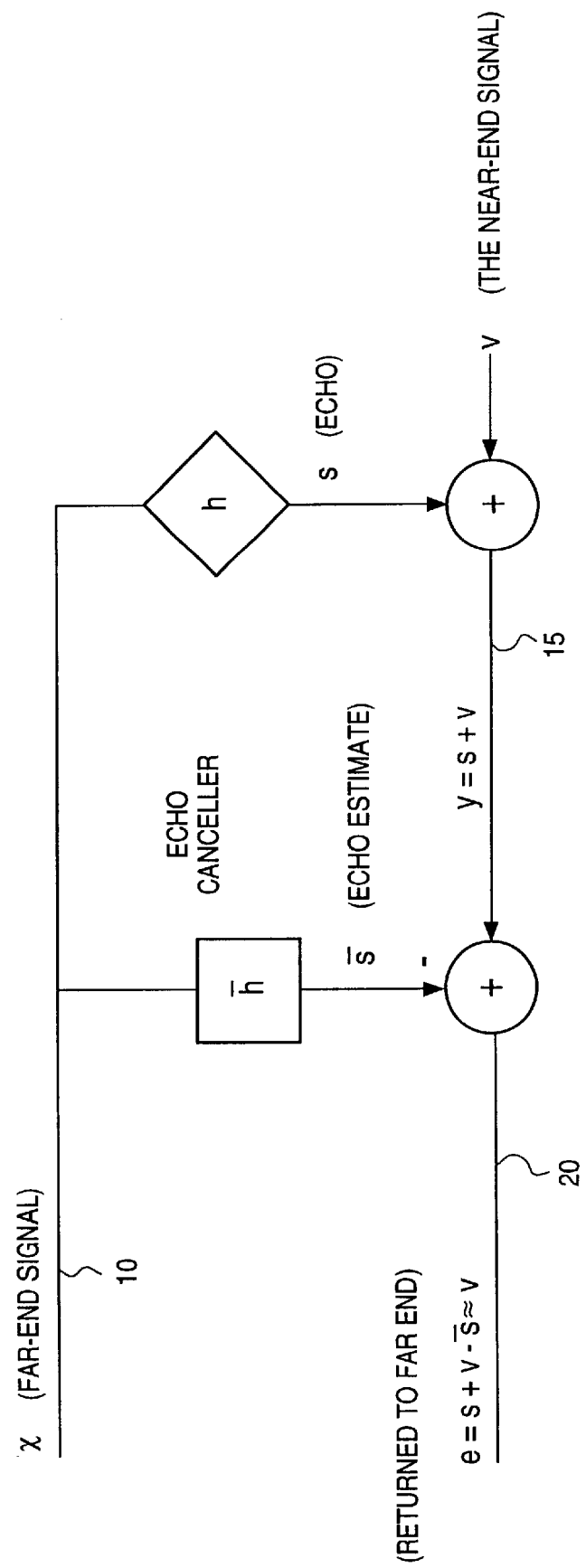
FIG. 1 is a block diagram of a conventional canceller.
Figure 2:
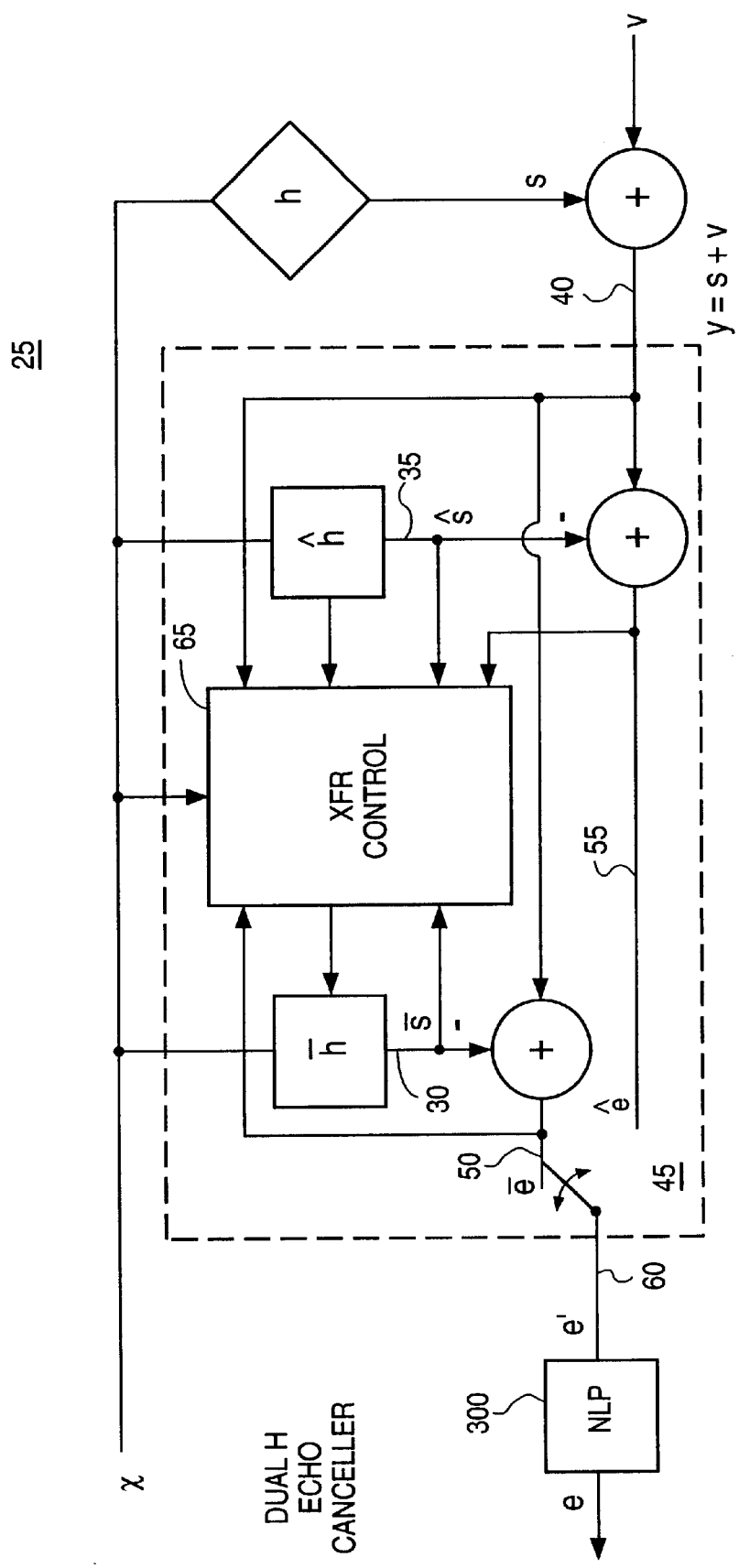
FIG. 2 is a schematic block diagram of an echo canceller that operates in accordance with one embodiment of the present invention.

FIG. 2 illustrates one embodiment of a dual-h echo canceller suitable for use in implementing the present invention. As illustrated, the echo canceller, shown generally at 25, includes both a non-adaptive filter $\bar{h}$ and an adaptive filter $\hat{h}$ to model the echo response h. Each of the filters $\bar{h}$ and $\hat{h}$ are preferably implemented as digital finite impulse response (FIR) filters comprising a plurality of taps each having a corresponding tap coefficient. The duration of each of the FIR filters should be sufficient to cover the duration of the echo response of the channel in which the echo canceller 25 is disposed.

The output of the non-adaptive filter $\bar{h}$ is available at the line 30 while the output of the adaptive filter $\hat{h}$ is available at line 35. Each of the signals at lines 30 and 35 are subtracted from the signal-plus-echo signal of line 40 to generate echo compensated signals at lines 50 and 55, respectively. A switch 45, preferably a software switch, may be used to selectively provide either the output signal at the line 50 or the output signal at line 55 to the echo canceller output at line 60.

A transfer controller 65 is used to transfer the tap coefficients of filter $\hat{h}$ to replace the tap coefficients of filter $\bar{h}$. As illustrated, the transfer controller 65 is connected to receive a number of system input signals. Of particular import with respect to the present invention, the transfer controller 65 receives the signal-plus-echo response y and each of the echo canceller signals $\bar{e}$ and $\hat{e}$ at lines 50 and 55, respectively. The transfer controller 65 is preferably implemented in the software of one or more digital signal processors used to implement the echo canceller 25.

As noted above, the art is substantially deficient of teachings with respect to the manner in which and conditions under which a transfer of tap coefficients from $\hat{h}$ to $\bar{h}$ is to occur. The present inventors have implemented a new process and, as such, a new echo canceller in which tap coefficient transfers are only made by the transfer controller 65 when selected criterion are met. The resulting echo canceller 25 has substantial advantages with respect to reduced double-talk sensitivity and increased double-talk detection capability. Further, it ensures a monotonic improvement in the estimates $\bar{h}$.

The foregoing system uses a parameter known as echo-return-loss-enhancement (ERLE) to measure and keep track of system performance. Two ERLE parameter values are used in the determination as to whether the transfer controller 65 transfers the tap coefficients from $\hat{h}$ to $\bar{h}$. The first parameter, $\bar{E}$, is defined in the following manner:

$$\bar{E} = \frac{y}{\bar{e}}$$

Similarly, the parameter $\hat{E}$ is defined as follows:

$$\hat{E} = \frac{y}{e}$$

Each of the values $\hat{E}$ and $\overline{E}$ may also be averaged over a predetermined number of samples to arrive at averaged $\hat{E}$ and $\overline{E}$ values used in the system for the transfer determinations.

Figure 3:
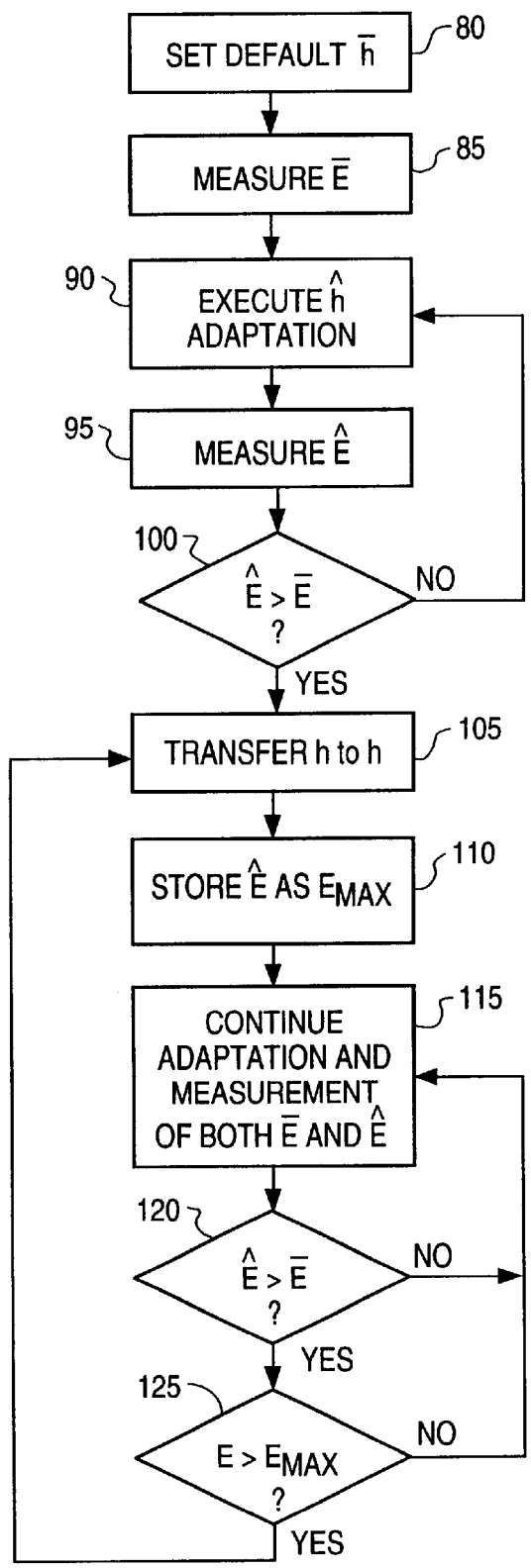
FIG. 3 is a flow chart illustrating one manner of carrying out coefficient transfers wherein the transfer conditions may be used to implement double-talk detection in accordance with one embodiment of the present invention.

FIG. 3 illustrates one manner of implementing the echo canceller 25 using the parameters $\hat{E}$ and $\overline{E}$ to control tap coefficients transfers between filter $\hat{h}$ to $\overline{h}$. As illustrated, the echo canceller 25 provides a default $\overline{h}$ set of coefficients at step 80 during the initial portions of the call. After the tap coefficients values for $\overline{h}$ have been set, a measure of $\overline{E}$ is made at step 85 to measure the performance of the tap coefficient values of filter $\overline{h}$.

After the initialization sequence of steps 80 and 85, or concurrent therewith, the echo canceller 25 begins and continues to adapt the coefficients of $\hat{h}$ to more adequately match the echo response h of the overall system. As noted in FIG. 3, this operation occurs at step 90. Preferably, the adaptation is made using a Normalized Least Mean Squares method, although other adaptive methods may also be used (e.g., LMS and RLS).

After a period of time has elapsed, preferably, a predetermined minimum period of time, the echo canceller 25 makes a measure of $\hat{E}$ at step 95. Preferably, this measurement is an averaged measurement. At step 100, the echo canceller 25 compares the value of $\hat{E}$ with the value of $\overline{E}$. If the value of $\hat{E}$ is greater than the value of $\overline{E}$, the tap coefficients of filter $\hat{h}$ are transferred to replace the tap coefficients of filter $\overline{h}$ at step 105. If this criterion is not met, however, the echo canceller 25 will continue to adapt the coefficients of the adaptive filter $\hat{h}$ at step 90, periodically measure the value of $\hat{E}$ at step 95, and make the comparison of step 100 until the condition is met.

If the echo canceller 25 finds that $\hat{E}$ is greater than $\overline{E}$, the above-noted transfer takes place. Additionally, the echo canceller 25 stores the value of $\hat{E}$ as a value $E_{max}$. This operation is depicted as step 110 of the FIG. 3. The value of $E_{max}$ is thus the maximum value of ERLE that occurs over the duration of the call and at which a transfer has taken place. This further value is used thereafter, in addition to the $\hat{E}$ and $\overline{E}$ comparison, to control whether the tap coefficients of $\hat{h}$ are transferred by the transfer controller 65 to replace the tap coefficients of $\overline{h}$. This further process is illustrated that steps 115, 120, and 125 of FIG. 3. In each instance, the tap coefficient transfer only occurs when both of the following two conditions are met: 1) $\hat{E}$ is greater than the current $\overline{E}$, and 2) $\hat{E}$ is greater than any previous value of $\overline{E}$ used during the course of the call. ($\hat{E}$ is greater than $E_{max}$). Each time that both criteria are met, the transfer controller 65 of echo canceller 25 executes the tap coefficient transfer and replaces the previous $E_{max}$ value with the current $\hat{E}$ value for future comparison.

Requiring that $\hat{E}$ be greater than any $\overline{E}$ value used over the course of the call before the coefficient transfer takes place has two beneficial and desirable effects. First, each transfer is likely to replace the prior tap coefficients of filter $\overline{h}$ with a better estimate of the echo path response. Second, this transfer requirement increases the double-talk protection of the echo canceller system. Although it is possible to have positive ERLE $\hat{E}$ during double-talk, the probability that $\hat{E}$ is greater than $E_{max}$ during double-talk decreases as the value of $E_{max}$ increases. Thus an undesirable coefficient transfer during double-talk becomes increasingly unlikely as the value of $E_{max}$ increases throughout the duration of the call.

The echo canceller 25 may impose both an upper boundary and a lower boundary on the value of $E_{max}$. For example, $E_{max}$ may have a lower bounded value of 6 dB and an upper bounded value of 24 dB. The purpose of the lower bound is to prevent normal transfers during double-talk conditions. It has been shown in simulations using speech inputs that during double-talk, a value of greater than 6 dB ERLE was a very low probability event. The upper bound on $E_{max}$ is used to prevent a spuriously high measurement from setting $E_{max}$ to a value at which further transfers become impossible.

The value of $E_{max}$ should be set to, for example, the lower bound value at the beginning of each call. Failure to do so will prevent tap coefficient transfers on a new call until the echo cancellation response of the echo canceller 25 on the new call surpasses the quality of the response existing at the end of the prior call. However, this criterion may never be met during the subsequent call thereby causing the echo canceller 25 to operate using sub-optimal tap coefficients values. Resetting the $E_{max}$ value to a lower value increases the likelihood that a tap coefficient transfer will take place and, thereby, assists in ensuring that the $\overline{h}$ filter uses tap coefficients for echo cancellation that more closely correspond to the echo path response of the new call.

Figure 4:
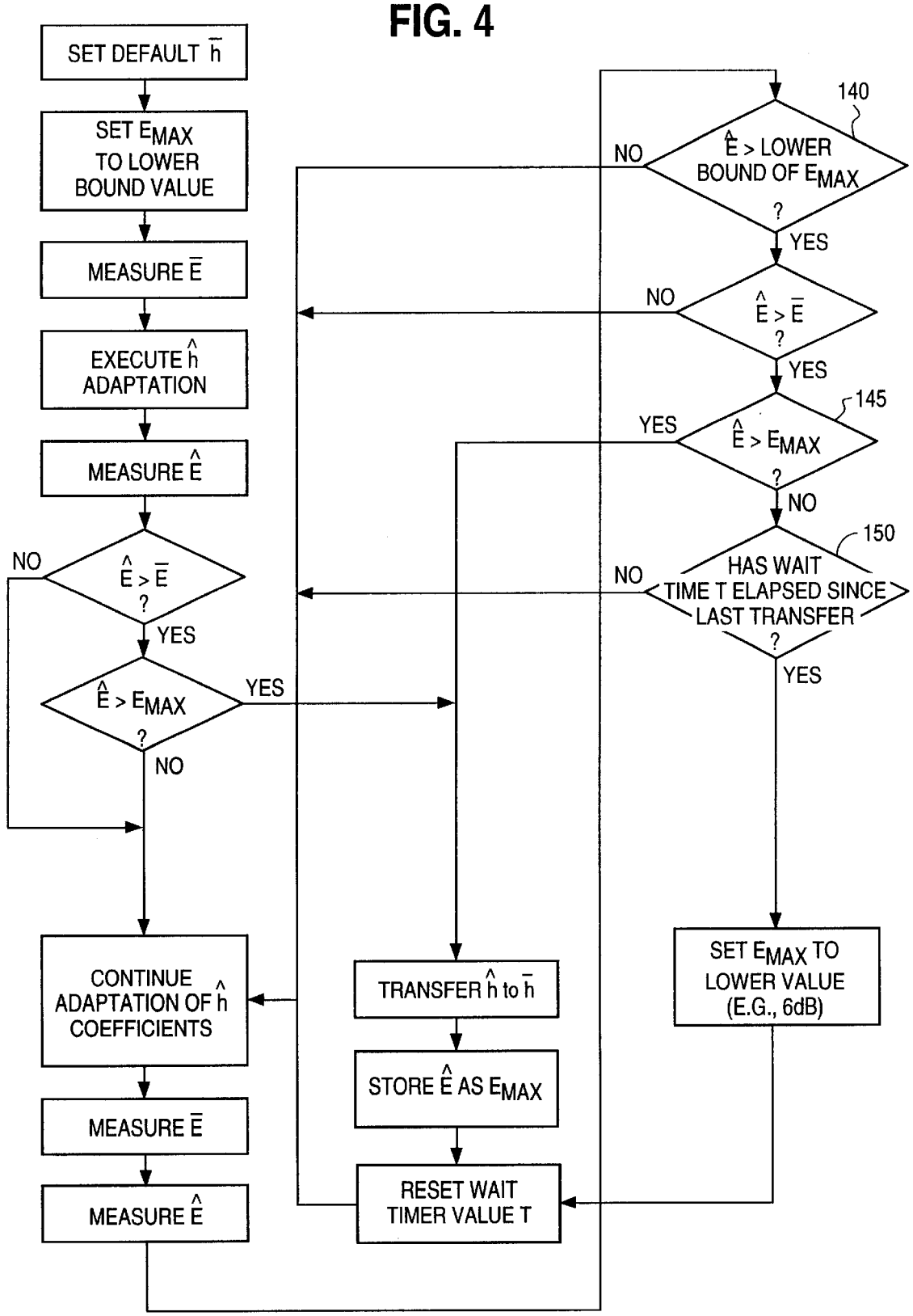
FIG. 4 is a flow chart illustrating a further manner of carrying out coefficient wherein the transfer conditions may be used to implement the double-talk detection an accordance with one embodiment of the present invention.

One manner of implementing the $E_{max}$ value change is illustrated in the echo canceller operations flow-chart of FIG. 4. When all transfer conditions are met except $\hat{E}$ greater than $E_{max}$, and this condition persists for a predetermined duration of time, the echo canceller 25 will reset the $E_{max}$ value to, for example, the lower bound value. In the exemplary operations shown in FIG. 4, the echo canceller 25 determines whether $\hat{E}$ is greater than the lower bound of $E_{max}$ at step 140 and less than the value of $E_{max}$ at step 145. If both of these condition remain true for a predetermined period of time as determined at step 150, and all other transfer criterion have been met, the echo canceller 25 resets the $E_{max}$ value to a lower value, for example, the lower bound of the $E_{max}$ value, at step 155. This lowering of the $E_{max}$ value increases the likelihood of a subsequent tap coefficient transfer.

Choosing values for the lower and upper bound of $E_{max}$ other than 6 dB and 24 dB, respectively, is also possible in the present system. Choosing a lower bound of $E_{max}$ smaller than 6 dB provides for a relatively prompt tap coefficient transfer after a reset operation or a new call, but sacrifices some double-talk protection. A value greater than 6 dB, however, inhibits tap coefficient transfer for a longer period of time, but increases the double-talk immunity of the echo canceller. Similarly, varying the value of the predetermined wait time T before which $E_{max}$ is reset may also be used to tweak echo canceller performance. A shorter predetermined wait time T produces faster reconvergence transfers, but may sacrifice some double-talk immunity. The opposite is true for larger predetermined wait time values.

A further modification of the foregoing echo canceller system relates to the value stored as $E_{max}$ at the instant of tap coefficient transfer. Instead of setting $E_{max}$ equal to the $\hat{E}$ value at the transfer instant, $E_{max}$ may be set to a value equal to the value of $\hat{E}$ minus a constant value (e.g., one, three, or 6 dB). At no time, however, should the $E_{max}$ value be set to a value that is below the lower bound value for $E_{max}$. Additionally, a further condition may be imposed in that a new softened $E_{max}$ is not less than the prior value of $E_{max}$. The foregoing "softening" of the $E_{max}$ value increases the number of transfers that occur and, further, provides more decision-making weight to the condition of $\hat{E}$ being larger than $\overline{E}$. Further details with respect to the operation of the echo canceller coefficient transfer process are set forth and the co-pending patent application titled "ECHO CANCELLER EMPLOYING DUAL-H ARCHITECTURE HAVING IMPROVED COEFFICIENT TRASFER", (U.S. Ser. No. 08/970,230) filed on even date herewith.

It is the latter of the foregoing benefits noted above in connection with the transfer process that the present inventors have recognized can be used to implement a Highly Sensitive Double-Talk Detector. As noted above, $E_{max}$ is the ERLE of $\hat{h}$ at the time of the most recent tap coefficient transfer. As such, $E_{max}$ provides two useful insights. First, it provides a measurement of the quality of the current $\overline{h}$, regardless of the current ERLE of $\overline{h}$. Second, the $E_{max}$ value servers as an approximation of the best ERLE experienced during the call. As noted above, it is possible to experience a positive ERLE during double-talk. However, the difference in the measured value of ERLE during double-talk and single talk grows larger as the echo canceller converges to an optimized solution. That is, as the value of $E_{max}$ increases, it becomes more likely that periods of time characterized by ERLE which is equal to $E_{max}$, or even a few dB below $E_{max}$, are single talk periods.

The converse is true, however, with respect to double-talk conditions. During double-talk conditions, the difference between the value of $E_{max}$ and $\hat{E}$ increases, despite the fact that the filter has substantially approached a convergence condition.

The present inventors have recognized that the foregoing condition may be utilized to implement a double-talk detector. Pursuant to the general approach proposed by the present inventors, a double-talk detection threshold value is calculated after a predetermined time period has elapsed to allow the echo canceller to approach a convergence condition. This threshold value may be set in accordance with at least two different manners. In determining the threshold value in accordance with the first manner, the threshold value represents the maximum value for the absolute value of the difference between the $\hat{E}$ and $E_{max}$ values beyond which a double-talk condition is declared. As such, if the $\hat{E}$ and $E_{max}$ value difference is greater than the value of the detection threshold value, a double-talk condition is declared for the echo canceller and the appropriate operations for this condition are executed. In determining the predetermined threshold value in accordance with the second manner, the threshold value is set to directly correspond with the $E_{max}$ value, for example, several dB below the $E_{max}$ value. If $\hat{E}$ value falls below the detection threshold value after the elapse of the convergence period, a double-talk condition is declared.

Figure 5:
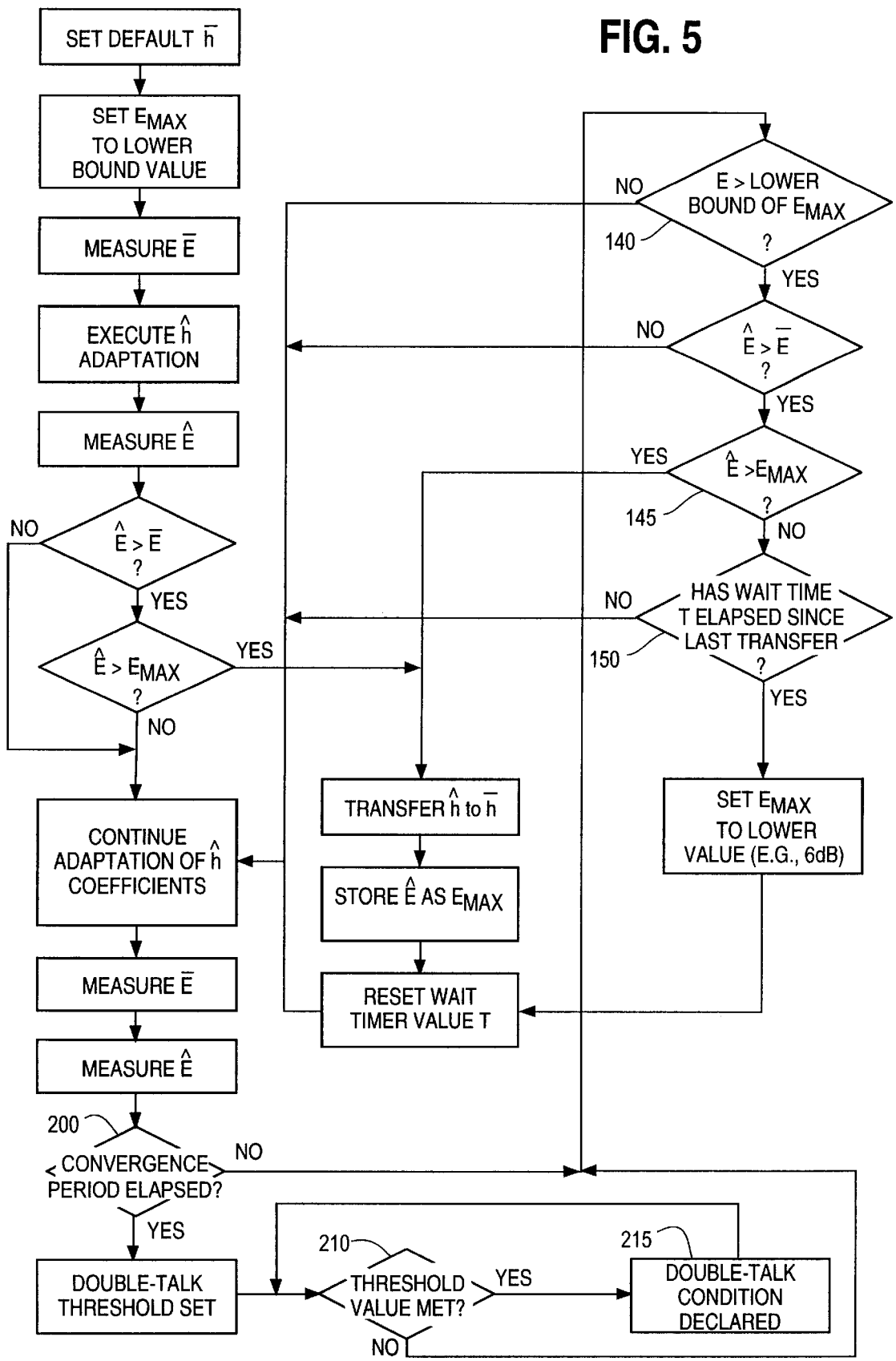
FIG. 5 is a flow chart illustrating the manner of adapting the process to the operational flow of the coefficient transfer process of FIG. 4.

FIG. 5 illustrates one manner of adapting the foregoing process to the operational flow of the coefficient transfer process of FIG. 4. As illustrated, a determination as to whether the convergence period has elapsed is made at step 200. If the period has indeed elapsed, the double-talk detector threshold value is set. During subsequent iterations, the double-talk detector threshold value may be updated as necessary at this step. The setting of the threshold value is preferably done in one of the two manners set forth above. At step 210, a determination is made as to whether a double-talk condition exists based the double-talk detection threshold value. The manner in which the double-talk detection occurs at step 210 is dependent on the manner in which the detection threshold value was set at step 200 As such, step 210 may comprise a comparison of the $\hat{E}$ value to the detector threshold value. Alternatively, step 210 may comprise a comparison of a difference value between the $\hat{E}$ and $E_{max}$ values to the detector threshold value. If a double-talk condition does not exist, the coefficient transfer process operations continue in the manner set forth in connection with the embodiment of FIG. 4. If a double-talk condition exists, this condition is declared to other portions of the echo canceller 25 at step 215. Further, the echo canceller 25 preferably prevents further $\hat{h}$ adaptations and $\hat{h}$ transfers to $\overline{h}$. However, the $\hat{h}$ adaptations may continue without further transfers until such time as the $\hat{h}$ coefficients converge approximately to the $\overline{h}$ coefficients solution. Such re-convergence may be used to signal the end of the double-talk condition. Alternatively, a double-talk condition may be declared as non-existent merely after a predetermined period of time has elapsed.

As will be readily recognized, the echo canceller of the present invention may be implemented in a wide range of manners. Preferably, the echo canceller system is implemented using one or more digital signal processors to carry out the filter and transfer operations. Digital-to-analog conversions of various signals are carried out in accordance with known techniques for use by the digital signal processors.

Numerous modifications may be made to the foregoing system without departing from the basic teachings thereof. Although the present invention has been described in substantial detail with reference to one or more specific embodiments, those of skill in the art will recognize that changes may be made thereto without departing from the scope and spirit of the invention as set forth in the appended claims.

What is claimed is:

1. An echo canceller, comprising:
   a first digital filter having non-adaptive tap coefficients that simulate an echo response;
   a second digital filter having adaptive tap coefficients that are updated and that simulate an echo response;
   a coefficient transfer controller that transfers the adaptive tap coefficients to replace the non-adaptive tap coefficients when a predetermined condition exists; and
   a double-talk detector that detects a double-talk condition in response to a value $E_{max}$ where $E_{max}$ is increased only when a coefficient transfer occurs where the adaptive tap coefficients of the second digital filter are transferred to replace the non-adaptive tap coefficients of the first digital filter.

2. The echo canceller of claim 1, wherein the double-talk detector determines a double-talk condition when a value $\hat{E}$ is less than the double-talk threshold value.

3. The echo canceller of claim 1, wherein the double-talk detector determines a double-talk condition when a difference value between $E_{max}$ and $\hat{E}$ exceeds a threshold value.

4. An echo canceller, comprising:
   means having non-adaptive tap coefficients for simulating an echo response;
   means having adaptive tap coefficients that are updated for simulating an echo response;
   means for transferring the adaptive tap coefficients to replace the non-adaptive tap coefficients when a predetermined condition exists; and
   means for detecting a double-talk condition in response to a value $E_{max}$ where $E_{max}$ is increased only when a coefficient transfer occurs where the adaptive tap coefficients of the means having adaptive tap coefficients are transferred to replace the non-adaptive tap coefficients of the means having non-adaptive tap coefficients.

5. The echo canceller of claim 4, wherein the means for detecting the double-talk condition determines a double-talk condition when a value $\hat{E}$ is less than the double-talk threshold value.

6. The echo canceller of claim 4, wherein the means for detecting the double-talk condition determines a double-talk condition when a difference value between $E_{max}$ and $\hat{E}$ exceeds a threshold value.

7. A method for detecting a double-talk condition, comprising:

ascertaining a value $E_{max}$ where $E_{max}$ is increased only when a coefficient transfer occurs where adaptive tap coefficients of a first filter are transferred to replace non-adaptive tap coefficients of a second filter; and using the value of $E_{max}$ to determine a double-talk condition.

8. The method of claim 7, wherein using the $E_{max}$ value comprises defining the $E_{max}$ value as a double-talk threshold value.

9. The method of claim 8 further comprising declaring the existence of the double-talk condition when a value of $\hat{E}$ is less than the double-talk threshold value.

10. The method of claim 7 further comprising declaring the existence of the double-talk condition when a difference value between $E_{max}$ and $\hat{E}$ exceeds a threshold value.

11. A computer-readable medium having stored thereon sequences of instructions, the sequences of instructions including instructions which, when executed by a processor, causes the processor to perform the steps of:

ascertaining a value $E_{max}$ where $E_{max}$ is increased only when a coefficient transfer occurs where adaptive tap coefficients of a first filter are transferred to replace non-adaptive tap coefficients of a second filter; and using the value of $E_{max}$ to determine a double-talk condition.

12. The computer-readable medium of claim 11, wherein the step of using the $E_{max}$ value comprises defining the $E_{max}$ value as a double-talk threshold value.

13. The computer-readable medium of claim 12, further comprising instructions that cause the processor to perform the step of declaring an existence of the double-talk condition when the value of $\hat{E}$ is less than the double-talk threshold value.

14. The computer-readable medium of claim 11, further comprising the step of declaring the existence of a double-talk condition when a difference value between $E_{max}$ and $\hat{E}$ exceeds a threshold value.

\* \* \* \* \*

UNITED STATES PATENT AND TRADEMARK OFFICE
CERTIFICATE OF CORRECTION

PATENT NO. : 6,266,409 B1
DATED : July 24, 2001
INVENTOR(S) : Kenneth P. Laberteaux and Richard C. Younce It is certified that error appears in the above-identified patent and that said Letters Patent is hereby corrected as shown below:

Column 4,
Line 4, insert -- transfers -- after "coefficient".
Lines 8-10, delete the phrase "FIG. 5 is a flow chart illustrating the manner of adapting the process to the operational flow of the coefficient transfer process of FIG. 4." and insert to read -- Figure 5 is a flow chart illustrating a method of carrying out coefficient transfers according to an alternate embodiment of the present invention. --

Column 7,
Line 37, delete the phrase "the absolute value"
Line 38, replace "$\hat{E}$ and $E_{max}$" with -- $E_{max}$ and $\hat{E}$ --.
Line 39, replace "$\hat{E}$ and $E_{max}$" with -- $E_{max}$ and $\hat{E}$ --.
Lines 66-67, replace "$\hat{E}$ and $E_{max}$" with -- $E_{max}$ and $\hat{E}$ --.

Signed and Sealed this

Tenth Day of September, 2002

Attest:

JAMES E. ROGAN
Attesting Officer
Director of the United States Patent and Trademark Office